United States Patent
Kutz et al.

(10) Patent No.: US 7,375,535 B1
(45) Date of Patent: May 20, 2008

(54) SCAN METHOD AND TOPOLOGY FOR CAPACITIVE SENSING

(75) Inventors: Harold Kutz, Snoqualmie, WA (US);
Warren Snyder, Snohomish, WA (US);
Tim Williams, Bellevue, WA (US);
Andrew Page, Kirkland, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 11/230,719

(22) Filed: Sep. 19, 2005

(51) Int. Cl.
*G01R 27/26* (2006.01)

(52) U.S. Cl. ..................... 324/658; 324/679

(58) Field of Classification Search ................ 324/658
See application file for complete search history.

(56) References Cited

U.S. PATENT DOCUMENTS

| | | | |
|---|---|---|---|
| 4,831,325 A | 5/1989 | Watson, Jr. | |
| 5,374,787 A | 12/1994 | Miller et al. | |
| 5,495,077 A | 2/1996 | Miller et al. | |
| 5,648,642 A | 7/1997 | Miller et al. | |
| 5,841,078 A | 11/1998 | Miller et al. | |
| 5,854,625 A | 12/1998 | Frisch et al. | |
| 5,861,583 A | 1/1999 | Schediwy et al. | |
| 5,914,465 A | 6/1999 | Allen et al. | |
| 5,920,310 A | 7/1999 | Faggin et al. | |
| 5,942,733 A | 8/1999 | Allen et al. | |
| 6,188,391 B1 | 2/2001 | Seely et al. | |
| 6,380,931 B1 | 4/2002 | Gillespie et al. | |
| 6,414,671 B1 | 7/2002 | Gillespie et al. | |
| 6,448,911 B1 * | 9/2002 | Somayajula | 341/120 |
| 6,570,557 B1 | 5/2003 | Westerman et al. | |
| 6,583,632 B2 | 6/2003 | Von Basse et al. | |
| 6,610,936 B2 | 8/2003 | Gillespie et al. | |
| 6,667,740 B2 | 12/2003 | Ely et al. | |
| 6,677,932 B1 | 1/2004 | Westerman | |
| 6,750,852 B2 | 6/2004 | Gillespie et al. | |
| 6,781,577 B2 | 8/2004 | Shigetaka | |
| 6,888,538 B2 | 5/2005 | Ely et al. | |
| 2003/0091220 A1 | 5/2003 | Sato et al. | |
| 2003/0210809 A1 | 11/2003 | Kim | |
| 2005/0031175 A1 * | 2/2005 | Hara et al. | 382/124 |
| 2005/0073324 A1 * | 4/2005 | Umeda et al. | 324/662 |
| 2005/0242823 A1 * | 11/2005 | Parker | 324/530 |

OTHER PUBLICATIONS

Seguine, Dennis. "Capacitive Switch Scan," Cypress Semiconductor Application Note, Apr. 14, 2005.
Seguine, Ryan. "Layout Guidelines for PSoC™ CapSense™," Cypress Semiconductor Application Note, Jul. 22, 2005.

* cited by examiner

*Primary Examiner*—Vincent Q. Nguyen
(74) *Attorney, Agent, or Firm*—Haverstock & Owens, LLP

(57) ABSTRACT

A capacitive sensing system (100) can connect groups of capacitive sensors (112-1 to 112-N) to a common node (106) to detect change in capacitance. States of a set of capacitive sensors (112-1 to 112-N) can thus be scanned faster than approaches that scan such sensors one-by-one. Faster scanning can allow for reduced power consumption in applications that only periodically scan the set of capacitive sensors (112-1 to 112-N).

16 Claims, 5 Drawing Sheets

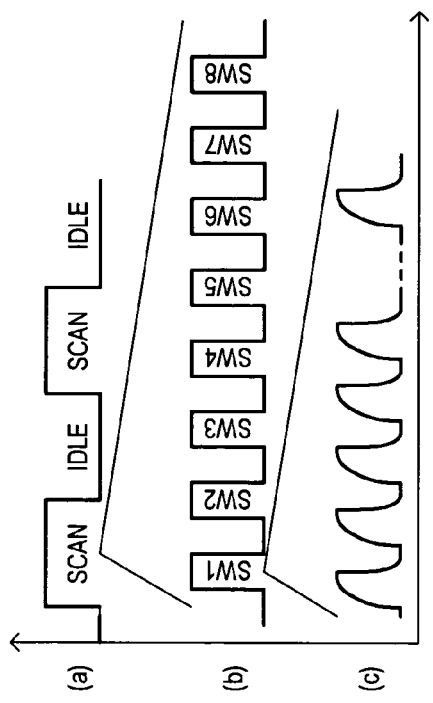
FIG. 4A (CONVENTIONAL)

SCAN METHOD AND TOPOLOGY FOR CAPACITIVE SENSING

TECHNICAL FIELD

The present invention relates generally to devices employing capacitive sensing, and more particularly to methods and topologies that scan multiple capacitive sensors.

BACKGROUND OF THE INVENTION

Capacitive sensors can provide a change in capacitance that represents the proximity of a sensed object. As but one very particular example, capacitive sensors can detect the presence of a pointing object, such as a finger, stylus, or pen. In such an application, an array of capacitive sensors can be scanned, and thereby serve as a pointing device in an electronic system (e.g., portable music player, personal digital assistant, tablet personal computer (PC), notebook PC, desktop PC, to name but a few). Capacitive sensors can be more robust and/or compact than other types of sensors that may include moving parts or more complex position detection approaches.

As understood from above, capacitive sensors can be used in portable devices, such as those operating off of a battery power supply. Reducing power consumption in such portable devices remains an ongoing goal. Accordingly, any reduction in the current draw of a capacitive sensing arrangement would be a welcome step in furthering the battery life of the corresponding device.

To better understand various features of the disclosed embodiment, a conventional capacitive sensing arrangement will now be described.

A conventional capacitive sensing system is set forth in FIG. 7 and designated by the general reference character 700. A system 700 can include an integrated circuit device 702 and a number of capacitive sensors 7041 to 704-N. Each capacitive sensor (704-1 to 704-N) can present a capacitance that can vary according to an input event. For example, a capacitive sensor (704-1 to 704-N) can include an electrode arranged within an array of like electrodes.

An integrated circuit device 702 can include a number of inputs 706-1 to 706-N, switching devices 710-1 to 710-N, a controller section 712, and a sense section 714. Each input (706-1 to 706-N) can be connected to a capacitive sensor (704-1 to 704-N) by a corresponding switching device (710-1 to 710-N). Each switching device (710-1 to 710-N) can be controlled according to a corresponding switching signal SW1 to SWN, and can connect a corresponding input (706-1 to 706-N) to a common node 708.

A controller section 712 can activate individual switching signals to thereby allow scanning of inputs (706-1 to 706-N). A sensing section 714 can determine when the capacitance at a scanned input increases due to an input event.

The general operation of the system of FIG. 7 is shown in a flow diagram in FIG. 8, and designated by the general reference character 800. A method 800 can include selecting a sensor (step 802). Once selected, a charge and dump (step 804) can occur at the resulting capacitor to generate a value representing the sensed capacitance. More particularly, one capacitor can be charged and then connected in parallel to a second capacitor to share accumulated charge. If the value does not reach a threshold (N from 806), a method can return to 804, to repeat that step until the threshold is reached. Once the threshold is reached (Y from 806), a determination can be made on whether an input event has occurred (step 807) (e.g., by measuring the number of times step 804 was repeated to reach the threshold). After this determination, the method can select a next electrode (step 808).

In this way, a set of capacitive sensors can be individually scanned, one-by-one to determine if a change of capacitance has occurred.

While the above conventional approach can provide a suitable method for detecting capacitive sensors of an input device, as noted above, it remains a continuing goal to arrive at some way of reducing the power consumption presented by such arrangements.

One approach to reducing power in a capacitive sensing arrangement like that of FIG. 7 is shown in FIG. 9. FIG. 9 shows a portion of a sensing section, like that shown as 714 in FIG. 7. A sensing section 900 can include two selectable capacitors $C_A$ and $C_S$ coupled to a common node 908. Capacitor $C_A$ can have a greater capacitance than capacitor $C_S$. In an active mode, capacitor $C_A$ can be coupled to node 908 while capacitor $C_S$ can be isolated from node 908. Thus capacitor $C_A$ can serve as an integrating capacitor used to detect a change in capacitance.

In contrast, in a standby mode, capacitor $C_S$ can be coupled to node 908 while capacitor $C_A$ can be isolated from node 908. Thus, smaller capacitor $C_S$ can serve as an integrating capacitor. Such smaller integrating capacitor $C_S$ can enable a faster scan of all sensors, and thus reduce power when such scans are performed periodically.

A drawback to an arrangement like that of FIG. 9 can be the increase in circuit components of the resulting system, as well as the need for an extra input to accommodate the second capacitor.

In light of the above, it would be desirable to arrive at some way of reducing power consumption and/or increasing the scanning speed in a capacitive sensing system that does not suffer from the drawbacks of the above conventional approaches.

SUMMARY OF THE INVENTION

The present invention can include a method of scanning capacitive sensors. Such a method can sequentially connect different sets of N capacitive sensor inputs to a common sense node, where N is an integer greater than 1. In addition, for each set of N capacitive sensor inputs, a capacitance can be measured to see if it is within a predetermined range.

Scanning sets of multiple sensor inputs can cycle through a given collection of inputs faster than approaches that scan on a one-by-one basis. A faster completion time for scanning can consume less current for those applications that only periodically scan a collection of inputs.

According to one aspect of the embodiments, determining if the capacitance of the N capacitive sensor inputs is within the predetermined range can include providing a charging current to the N capacitive sensor inputs, and determining if a time to charge the N sensor inputs exceeds a minimum charge time limit.

In this way, an increase in capacitance, due to an input event, can be indicated by a longer charging time.

According to another aspect of the embodiments, the step of sequentially connecting different sets of capacitive sensor inputs to a common sense node can include activating switches that couple each of the N capacitive sensor inputs to the common sense node.

Such a feature can be conveniently implemented by a programmable multiplexer circuit.

According to another aspect of the embodiments, the method can further include, in a standby mode, sequentially cycling through all sets of N capacitive sensor inputs, and determining that the capacitance of the N capacitive sensors is within the predetermined range. If all sets are within the range, all capacitive sensor inputs can be isolated from the common node for a predetermined idle period before returning to a scanning operation.

In this way, a method may periodically "wake-up", scan all the inputs in sets of N, and then return to a sleep mode. Such an approach can consume less power than conventional arrangements that may scan on a one-by-one basis.

According to another aspect of the embodiments, the method can further include, after determining that the capacitance of the N capacitive sensors is not within the predetermined range, continuing to detect if the capacitance at the capacitive sensor inputs continues to remain outside the predetermined range.

In this way, an input event at one or more of the N capacitive sensors can result in the sensors continuing to be scanned.

According to another aspect of the embodiments, the method can further include, in a high resolution mode, sequentially connecting sets of M capacitive sensor inputs to a common sense node, where M is less than N. Further, for each M capacitive sensor inputs, a capacitance can be sensed to determine if it is within a predetermined range. A number M can be one.

In this way, a method can switch between a low power, lower resolution mode (sets of x N) and a higher power, higher resolution mode (sets of x M).

The present invention can also include a capacitive sensor scanning system. Such a system can have a plurality of switch devices that connect capacitive sensor inputs to a common node when enabled. A measuring circuit can be coupled to the common node, and can determine when the capacitance at the common node is outside of a predetermined range. A switch controller can sequentially enable different sets of N switch devices at the same time.

In this way, multiples of N inputs can be simultaneously connected to a common node for a capacitance measurement.

According to one aspect of the embodiments, a capacitive sensor can be coupled to each capacitive sensor input. The capacitive sensors may be arranged into an array for sensing the position of an object within the array.

In this way, the present invention can be used to scan an array of sensors, such as in a touch input device.

According to another aspect of the embodiments, each capacitive sensor can comprise a single sensor plate coupled to a corresponding switch device. Each single sensor plate can be separated from an adjacent sensor plate by a ground plate that is essentially coplanar to the sensor plate and an adjacent sensor plate.

According to another aspect of the embodiments, the measuring circuit can include a discharge device coupled between the common node and a low power supply node that is enabled after a set of N switch devices is enabled, and is disabled prior to the next set of N switch devices being enabled.

In this way, the common node can be discharged between measuring operations for each different set of N capacitive sensor inputs.

According to another aspect of the embodiments, the measuring circuit can include an oscillator circuit that outputs a periodic signal that varies according the capacitance at the common node.

In this way, a capacitance at a set of capacitive sensor inputs can be measured according to the frequency of an oscillating signal.

According to another aspect of the embodiments, the measuring circuit can further include a counter circuit that generates a count value from the periodic signal.

According to another aspect of the embodiments, the measuring circuit can further include a comparator that compares the count value to a predetermined count threshold value.

According to another aspect of the embodiments, the switch controller can sequentially enable different sets of M switch devices in a second mode, where M<N.

The present invention can further include another capacitive sensing method. In a scan operation, different sets of multiple capacitive sensor inputs can be coupled to a common node. For each set of capacitive sensor inputs, a determination can be made as to whether the capacitance at the common node is within a given range. A sense indication can be generated if the capacitance is outside the given range.

According to one aspect of the embodiments, a method can further include, after coupling a set of capacitive sensor inputs to the common node, providing a charge current to the common node.

According to another aspect of the embodiments, a method can further include, after determining whether the capacitance at the common node is within a given range, discharging the common node.

According to another aspect of the embodiments, determining whether the capacitance at the common node is within a given range can include charging and discharging the common node within a given time period to generate a count value corresponding to the capacitance.

According to another aspect of the embodiments, determining whether the capacitance at the common node is within a given range further includes comparing the count value to a predetermined limit.

According to another aspect of the embodiments, a method can further include, in an idle operation, isolating all sets of capacitive sensor inputs from the common node.

BRIEF DESCRIPTION OF THE DRAWINGS

FIGS. 4A and 4B are timing diagrams comparing a conventional capacitive sensor scan operation to that according to an embodiment of the present invention.

DETAILED DESCRIPTION

Various embodiments of the present invention will now be described in detail with reference to a number of drawings. The embodiments show systems and methods that can provide for faster scan of capacitive sensing inputs without added components or inputs.

Figure 1:
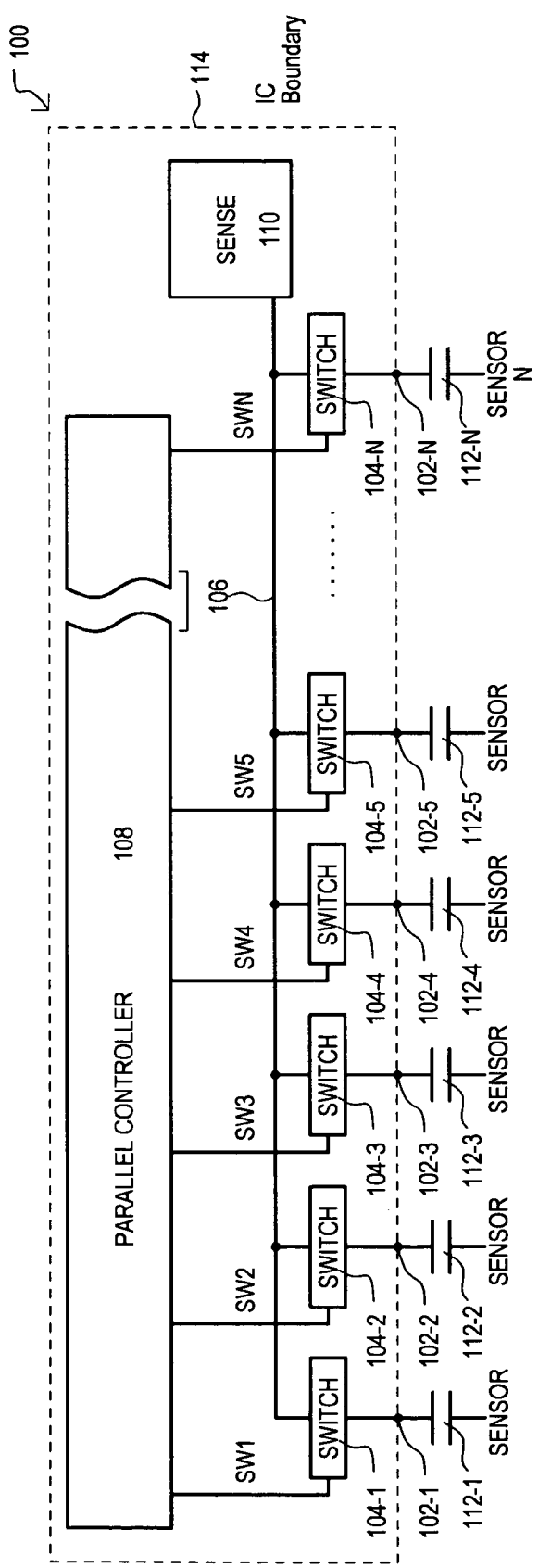
FIG. 1 is a block schematic diagram of a capacitive sensing system according to a first embodiment of the present invention.

A capacitive sensing system according to a first embodiment is set forth in FIG. 1, and designated by the general reference character 100. A system 100 can include a number of inputs 102-1 to 102-N, switching devices 104-1 to 104-N, a common node 106, a parallel switch controller section 108, and a sensing section 110. Inputs (102-1 to 102-N) can be connected to common node 106 by operation of corresponding switching devices (1041 to 104-N). Switching devices (104-1 to 104-N) can be enabled and disabled according to signals SW1 to SWN, respectively.

Figure 7:
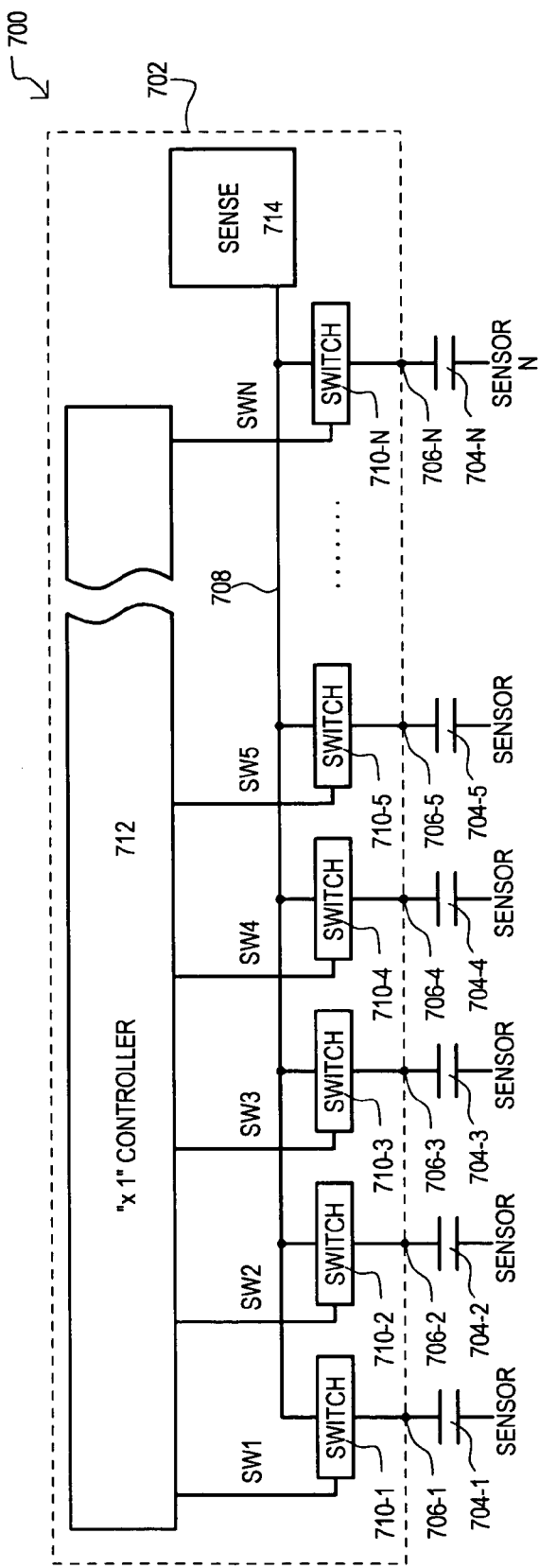
FIG. 7 is a block diagram of a conventional capacitive sensing system.
Figure 8:
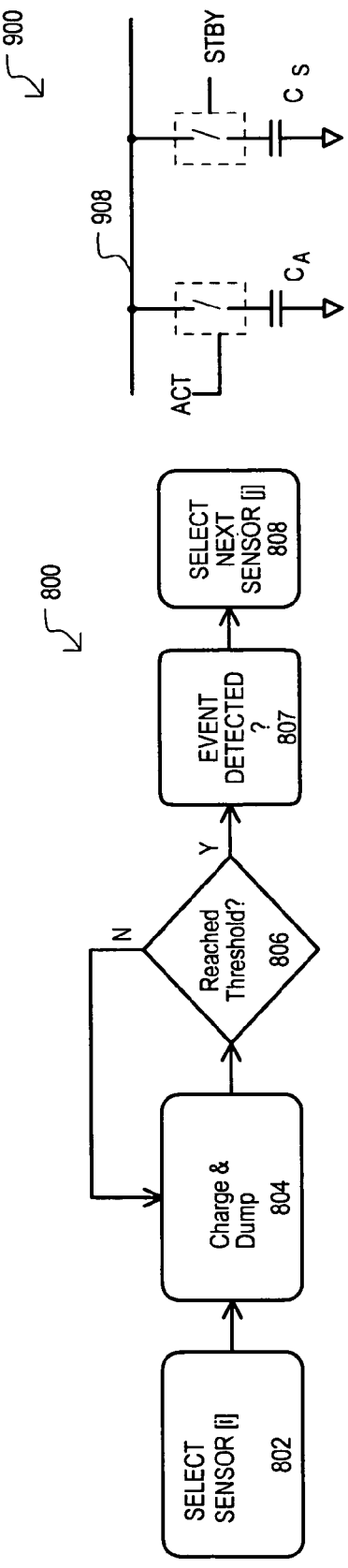
FIG. 8 is a flow diagram of a capacitive sensing method.
Figure 9:
FIG. 9 is a block schematic diagram of another capacitive sensing approach.

A parallel switch controller section 108 can activate signals SW1 to SWN. However, unlike a conventional approach like that of FIG. 7, parallel switch controller 108 can activate multiple signals in parallel, thus enabling multiple switches at the same time. As a result, two or more inputs (102- to 102-N) can be connected to common node 108 at the same time.

Sensing section 110 can measure a capacitance at common node 108 to thereby detect changes in capacitance at any of multiple inputs (102-0 to 102-N) connected to the common node 108. Various particular examples of sensing sections will be described at a later point herein.

In the particular example of FIG. 1, inputs 102-1 to 102-N, switching devices 104-1 to 104-N, common node 106, parallel switch controller section 108, a sensing section 110 can form part of a single integrated circuit 114. In one very particular example, an integrated circuit 114 can be selected from the PSoC™ family of mixed-signal array systems-on-a-chip, manufactured by Cypress Semiconductor Corporation, of San Jose, Calif.

FIG. 1 also shows capacitive sensors 112-1 to 112-N connected to inputs (102-1 to 102-N). Capacitive sensors (112-1 to 112-N) can provide a change in capacitance in response to an input event.

In this way, a system 100 can scan multiple capacitive sensor inputs at one time. Consequently, a set of capacitive sensors (112-0 to 112-N) can be completely scanned (i.e., all sensors checked) faster than conventional approaches that scan one sensor at a time. In applications where sensors are only periodically scanned, such an approach can complete a scanning of all inputs in less time, reducing consumed charge current and hence reducing overall power consumption.

Figure 2:
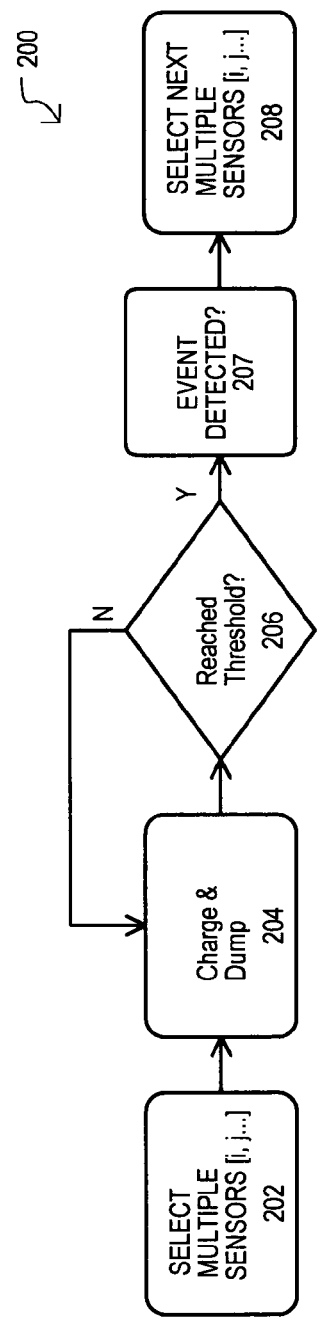
FIG. 2 is a flow diagram of a capacitive sensing method according to a second embodiment of the present invention.

Having described a system for capacitive sensing, a method of scanning capacitive sensors will now be described with reference to FIG. 2. FIG. 2 is a flow diagram showing a method of scanning capacitive sensors 200 that includes selecting multiple sensors (step 202). Such multiple sensors can then be charged and dumped (step 204) to thereby provide a measurement of their collective capacitance. If the signal does not meet a predetermined threshold (N from 206), the charge and dumping step 204 can be repeated. Once the threshold is reached (Y from 206), a determination of whether an input event has occurred at the selected group of sensors can be made (step 207). This can be done e.g., by counting the number of times step 204 was repeated to reach the threshold. The method can then proceed to select a next group of multiple sensors (step 208).

It is understood that the number of selected sensors can be an arbitrary number greater than 1, selected to provide a desired overall scan completion speed, signal to noise ratio, or other criteria.

Figure 3:
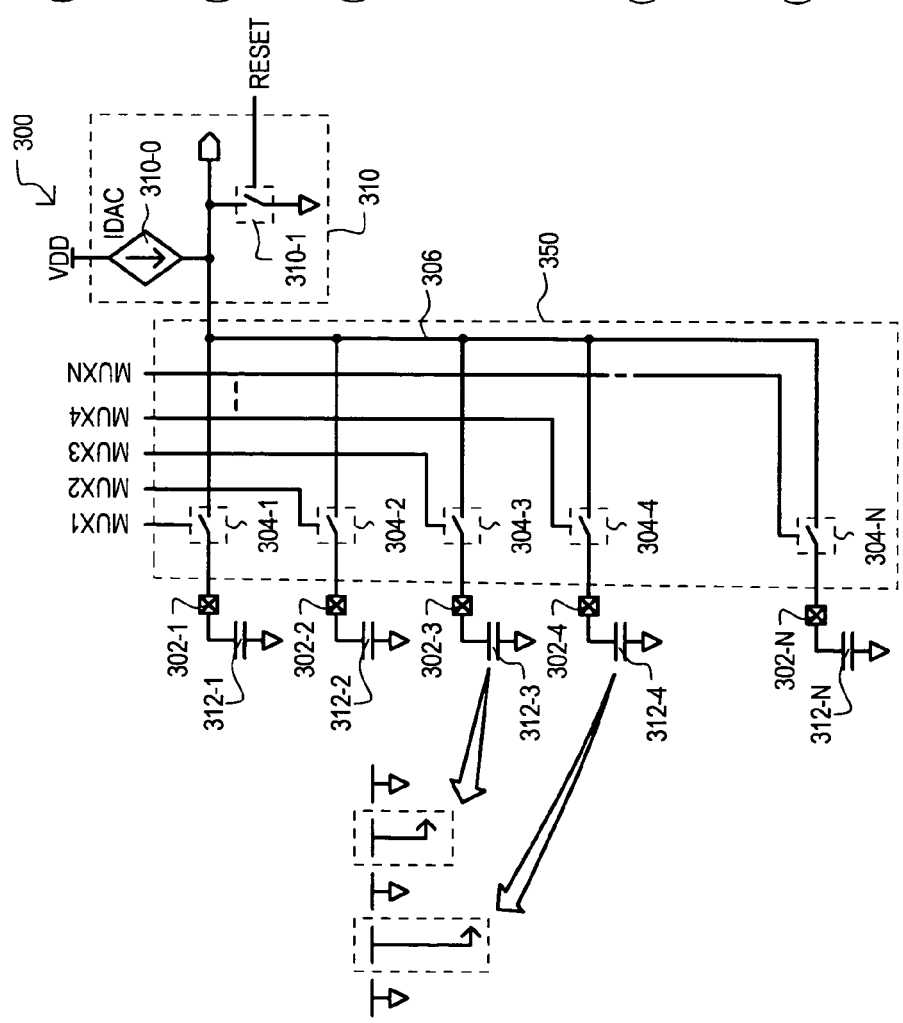
FIG. 3 is a block schematic diagram of an input structure that can be used in a capacitive sensing system according to one embodiment of the present invention.

Referring now to FIG. 3, one example of an input structure according one embodiment of the present invention is set forth in a block schematic diagram. The input structure 300 can include some of the same general sections as FIG. 1. Accordingly, like sections are referred to with the same reference character but with the first digit being a "3" instead of a "1".

In the very particular example of FIG. 3, switching devices 304-1 to 304-N can be formed from a large programmable multiplexer (MUX) structure 350 having inputs coupled to general purpose input/output (I/O) pins of a integrated circuit (IC) device. Thus, inputs (302-1 to 302-N) can be pins of an IC device. Within MUX structure 350, switching devices (304-1 to 304-N) can be controlled by corresponding MUX signals MUX1 to MUXN.

A sensing section 310 can include, among other circuit components, a programmable current source 310-0 and reset device 310-1. A programmable current source 310-0 can be programmable digital-to-analog converter (DAC) current source that can provide a charge current according to a digital value. A reset device 310-1 can couple common node 306 to a ground potential, to thereby discharge the node to allow another charge operation to occur.

It is noted that a PSOC™ type SOC advantageously includes an input MUX structure like that shown as 350 in FIG. 3. In particular, a PSOC™ type SOC can include general I/Os connected to such a MUX structure that can provide a path to a common analog node.

In the very particular example of FIG. 3, each capacitive sensor (312-1 to 312-N) can be a single plate sensor that is separated from an adjacent sensor by a ground plate. This is shown for capacitive sensors 312-3 and 312-4.

Of course, the present invention should not be construed as being limited to any particular type of sensor structure.

Figure 4B:
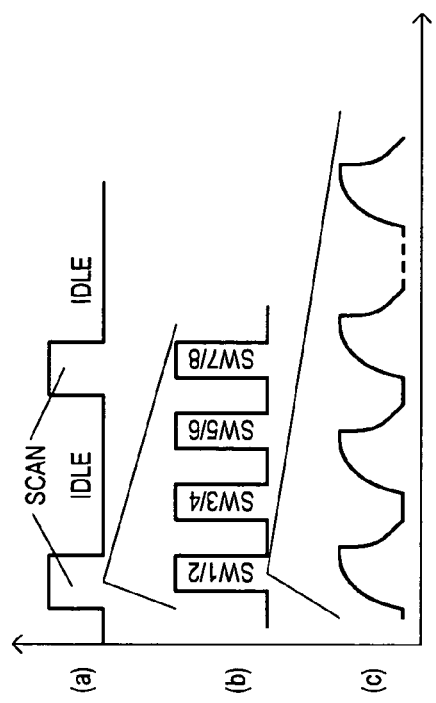

Referring now to FIGS. 4A and 4B, timing diagrams are shown that compare sensing operations according to one embodiment to those of a conventional approach. Both FIGS. 4A and 4B show three waveforms: (a) which shows SCAN modes, in which capacitive sensors are scanned, and IDLE modes, in which capacitive sensors are not scanned; (b) which shows a scan operation for a collection of eight capacitive sensors; and (c) which shows the capacitive sensing for one sensor.

Referring now to waveforms (a), a comparison shows that an approach like that of FIG. 4B can consume less power than that of FIG. 4A, as the overall SCAN mode can be shorter in duration.

Waveforms (b) show how a shorter scanning duration can be achieved in FIG. 4B by activating multiple switching devices. The very particular example of FIGS. 4A and 4B shows the activation of eight switching devices SW1 to SW8. Further, FIG. 4B shows an embodiment in which two switching devices are activated at the same time. Of course, in other embodiments more switching devices could be activated at the same time.

Waveforms (c) show how current may be consumed while a switching device is activated. As shown, a capacitance that includes the capacitive sensor(s) can be charged and discharged multiple times to generate a count value the reflects the overall capacitance.

In this way, the above embodiments can reduce power consumption in a capacitive sensing system that periodically scans a set of capacitive sensors.

While the above systems and methods have shown various examples in which scans can be performed on particular numbers of capacitive sensors, alternate arrangements can allow for variations in the number of capacitive sensors accessed for a given scan operation. One such example is shown in FIG. 5 and designated by the general reference character 500.

Figure 5:
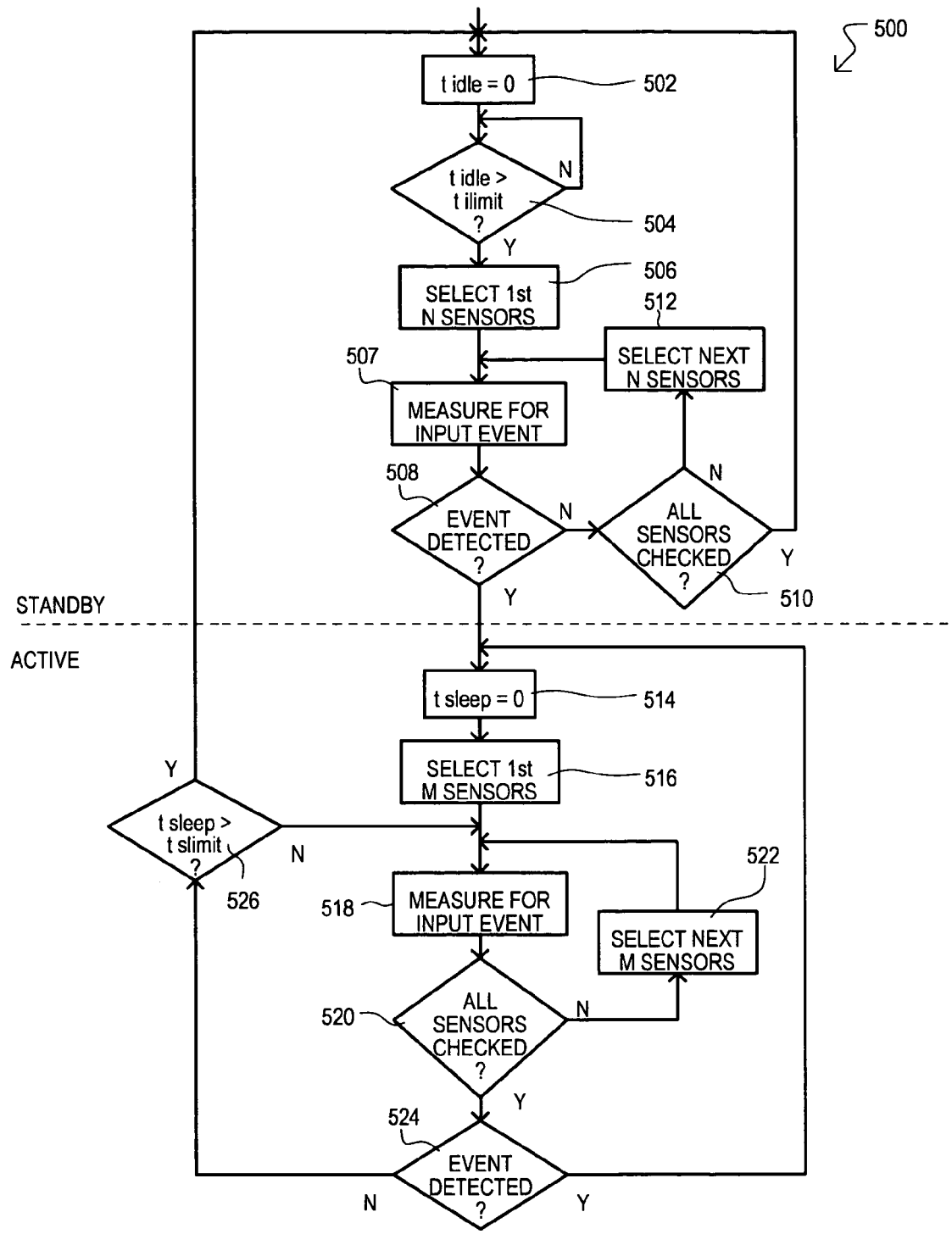
FIG. 5 is a flow diagram of a capacitive sensing method according to a third embodiment of the present invention

FIG. 5 shows a method 500 in which scanning can switch from a STANDBY mode, in which N capacitive sensors are sensed at the same time, to an ACTIVE mode in which a smaller number of M capacitive sensors are sensed at a time.

A method 500 can include resetting an initial idle time value (step 502). An idle time can reflect the time between scans of a set of capacitive sensors in an idle mode. If an idle time limit is exceeded (Y from 504) a first N sensors can be selected (step 506). It is understood that N is greater than 1. A selected group of N sensors can then be measured for an input event (step 507).

If an input event has not been detected in a given set of capacitive sensors (N from 508), a method can check to see if all sensors have checked with no sense result (e.g., capacitance within range). If this is the case (Y from 510) a method can return to an idle state. If this is not the case, the method can proceed to a next set of capacitive sensors (step 512) and repeat the sensing steps.

If an input event has been detected in a given set of capacitive sensors (Y from 508), a method can "wake up" and transition to an active scan mode. In an active mode, a method 500 can reset a sleep time value (step 514). A sleep time value can reflect the time that must lapse in order to return to a standby state.

A method 500 can then proceed to select a first M capacitive sensors (step 516). It is understood that M is less than N, and can be equal to 1. A selected M sensors can then be measured for an input event (step 518). It is understood that such a step can vary from step 508 due to the difference in sensed capacitance. As but a few of the many possible examples, such a step can employ a different threshold value (e.g., count value or oscillator threshold voltage) and/or charging current.

A method 500 can then check to see if all sensors have been checked (step 520). If this is not the case (N from 520), the method can proceed to a next M capacitive sensors (step 522) and repeat the detection steps. If all sensors have been checked (Y from 520) a method can proceed to determine whether an input event has occurred (step 524).

If an input event is detected (Y from 524), active sensing operations can continue. If an input event is not detected (N from 524), a method can check to see if a sleep time has been reached (step 526) If a sleep time has not been reached (N from 526), a method can continue to scan the capacitive sensors in an "x M" fashion. If a sleep time has been reached (Y from 526), a method can return to a standby state.

In this way, a method can maintain a lower power "x N" scanning of capacitive sensors, and, upon detection of an input event, switch to a higher power, but higher resolution "x M" scanning of the capacitive sensors.

In the various embodiments described above, detection of a capacitance change in a selected group of capacitive sensors can be based on any number of approaches well known to those skilled in the art. One very particular approach will now be described with reference to FIG. 6. However, it is understood that this one approach should not be construed as limiting to the invention.

Figure 6:
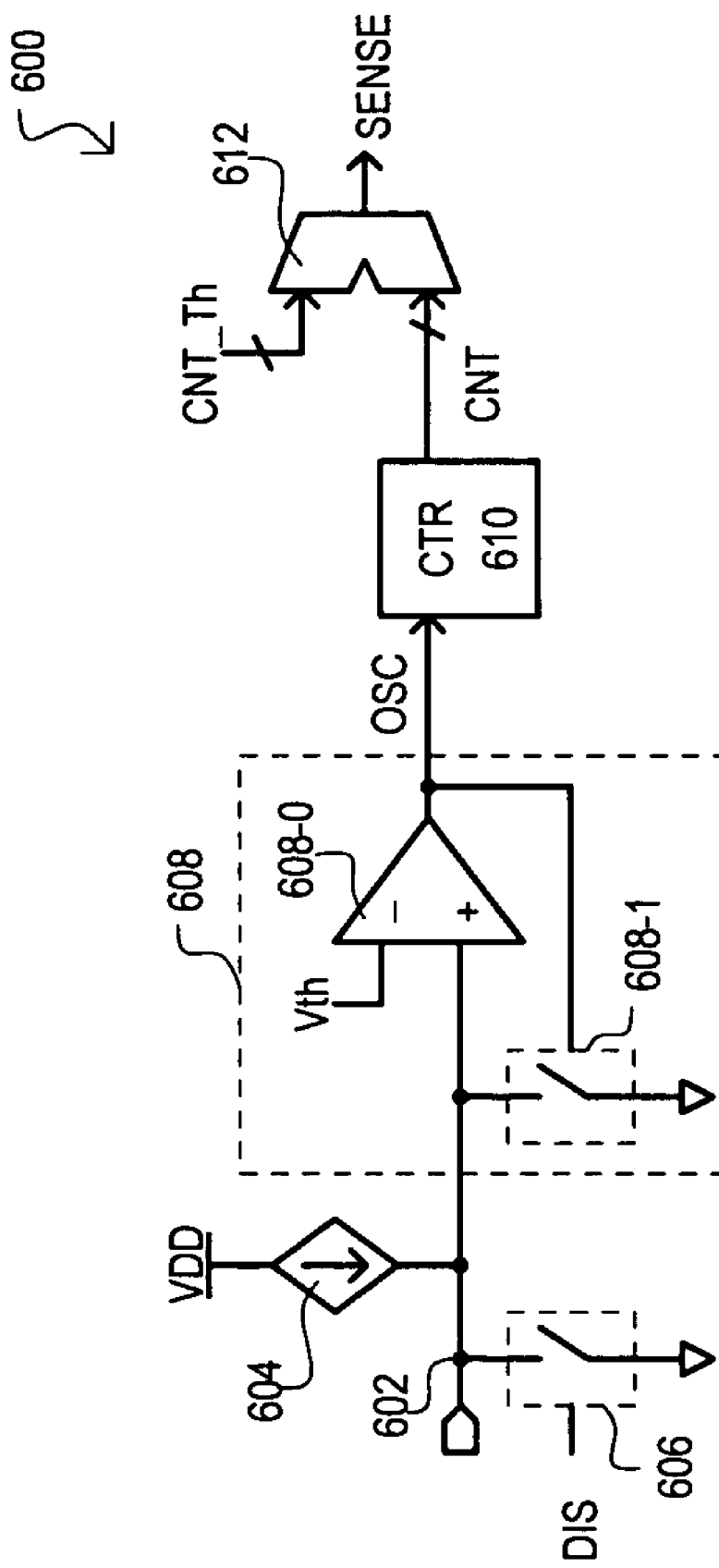
FIG. 6 is a block schematic diagram of a sensing section that can be used in a capacitive sensing system according to one embodiment of the present invention.

FIG. 6 is a block schematic diagram of a sense section designated by the general reference character 600. A sense section 600 can be used as a sense section like that shown as 110 in FIGS. 1 and 312 in FIG. 3.

A sense section 600 can utilize an oscillator to generate a count value based on a sensed capacitance. An input node 602 can be connected to the capacitance to be sensed. For example, an input node 602 can be a common node connected to multiple capacitive sensors simultaneously. A sense section 600 can include a charge device 604 that can charge the input node 602 and a disable device 606 that can connect input node 602 to a ground potential.

A sense section 600 can further include a relaxation type oscillator 608. As is well understood, within a relaxation type oscillator, an amplifier 608-0 can provide a low output as input node 602 charges according to a sensed capacitance. Once the potential at input node 602 exceeds a predetermined threshold voltage Vth, amplifier 608-1 can provide a high output that enables reset device 608-1. As a result, reset device 608-1 can discharge input node 602, and the output of amplifier 608-1 can return low. In this way, a relaxation oscillator 608 can generate signal OSC that oscillates according to a sensed capacitance.

A signal OSC can be provided to a counting circuit 610 which can generate a count value CNT representative of the oscillating frequency. Such a count value CNT can be provided to a comparator 612 that can compare a CNT value to a count threshold value CNT_Th. According to a comparison result, a SENSE value can be generated. As but one example, if a CNT value is less than CNT_Th, a SENSE value can be active, indicating an input event has occurred. If a CNT value is more than CNT_Th, a SENSE value can be inactive, indicating an input event has not occurred.

In this way, a capacitance generated by multiple capacitive sensors can be checked to detect a change in capacitance with respect to an expected value.

While the above embodiments can be utilized in a wide variety of applications, such systems and methods may be particularly useful when used as a position scanner for a capacitive touch sensor, or the like. In particular, the embodiments can provide a reduced power sleep, or idle mode, in which scanning through a set of sensors can be accomplished faster than conventional approaches, thus reducing power consumption.

Group scanning of capacitance sensors as described above may thus be well suited for human interface devices that can "wake-up" once an input condition (e.g., finger touch, stylus touch, etc.) has been detected.

Further, in very particular embodiments, an input switch structure and nearly all other system sections (save the capacitive sensors themselves) can be provided by single integrated circuit device, such as a PSOC™ type SOC.

When utilized to scan an array of capacitive sensors, the embodiments can provide substantial improvements in scanning speed. For example, when a scan employs "x 2" sensing in such an array, scanning can be four times faster than a "x 1" conventional approach.

It is understood that scanning according to the above embodiments may have some drawbacks over conventional approaches that scan one capacitive sensor at a time. In particular, there may be a decrease in signal-to-noise ratio (SNR) as sensing at more sensors can add to the noise present at a sense node. Further, sensing based on multiple capacitive sensors may result in a loss of spatial resolution and amplitude resolution, as position and change in capacitance is spread over multiple positions.

However, the power and speed advantages achieved by the embodiments are believed to outweigh such drawbacks.

To illustrate the above features, a comparison between a conventional scanning approach and one according to an embodiment will now be described.

Conventional Case.

The conventional example assumes that a system scans individual capacitive sensors comprising a 30 pF electrode that provides a 1 pF change in capacitance when loaded (input event). Further, the system includes an integrating capacitor of 30 nF. In such an arrangement, a background count (no load) can be 500 counts. When loaded, due the increase in capacitance, a count can be 484 counts.

Within the system, noise resulting from quantization is 0.3 root-mean-square (rms). In addition, the comparator adds 0.5 rms. This yields an rms noise value of 0.6.

A calculation of the SNR in dB is given as:

$$20 \log_{10}(16 \text{ count signal}/0.6 \text{ count noise}) = 28.5 \text{ dB}.$$

EMBODIMENT EXAMPLE

The embodiment example assumes the same general system values as the preceding conventional case. However, it will be assumed that two capacitive sensors are grouped together. Accordingly, in such an arrangement, a background count (no load) can be 250 counts, while a loaded count can be 246 counts.

Within the system, noise resulting from quantization remains at 0.3 rms. However, the comparator adds 0.25 rms, as the steps for counting are larger. This can yields an rms noise value of 0.4.

A calculation of the SNR in dB is given as:

$$20 \log_{10}(4 \text{ count signal}/0.4 \text{ count noise}) = 20.0 \text{ dB}.$$

From the above, sensing based on combining two capacitive sensors results in a loss of 8.5 dB, which is less than a full factor of four. This loss in SNR is believed to be outweighed by the 4× increase in scan speed for an array of capacitive sensors, and corresponding reduction in power consumption.

It is understood that the embodiments of the invention may be practiced in the absence of an element and or step not specifically disclosed. That is, an inventive feature of the invention can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A method of scanning capacitive sensors, comprising the steps of:
sequentially connecting different sets of N capacitive sensor inputs to a common sense node, where N is an integer greater than 1, by activating switches that each couple one of the N capacitive sensor inputs to the common sense node; and
for each set of N capacitive sensor inputs, detecting if a capacitance at the N capacitive sensor inputs is within a predetermined range, including
providing a charging current to the N capacitive sensor inputs, and
determining if a time to charge the N capacitive sensor inputs is outside a predetermined timing range.

2. The method of claim 1, further including:
in a standby mode,
after sequentially connecting all sets of N capacitive sensor inputs to a common sense node and determining that the capacitance of the N capacitive sensors is within the predetermined range, isolating all capacitive sensor inputs for a predetermined idle period before returning to scanning the sets of N capacitive sensor inputs.

3. The method of claim 2, further including:
after determining that the capacitance of the N capacitive sensors is not within the predetermined range, continuing to detect if the capacitance at the capacitive sensor inputs continues to remain outside the predetermined range.

4. The method of claim 1, further including:
sequentially connecting M capacitive sensor inputs to a common sense node, where M is less than N, and
for each M capacitive sensor inputs, detecting if a capacitance at the M capacitive sensor inputs is within another predetermined range.

5. A capacitive sensor scan system, comprising:
a plurality of switch devices that connect capacitive sensor inputs to a common node when enabled;
a measuring circuit coupled to the common node that determines when the capacitance at the common node is outside of a predetermined range, the measuring circuit including an oscillator circuit that outputs a periodic signal that varies according the capacitance at the common node; and
a switch controller that sequentially enables different sets of N switch devices essentially simultaneously.

6. The system of claim 5, further including:
a capacitive sensor coupled to each capacitive sensor input, the capacitive sensors arranged into an array for sensing the position of an object with respect to the array.

7. The system of claim 6, wherein:
each capacitive sensor comprises a single sensor plate coupled to a corresponding switch device and separated from an adjacent sensor plate by a ground plate that is essentially coplanar to the sensor plate and adjacent sensor plate.

8. The system of claim 5, wherein:
the measuring circuit includes
a discharge device coupled between the common node and a low power supply node that is enabled after a set of N switch devices is enabled, and disabled prior to the next set of N switch devices being enabled.

9. The system of claim 5, wherein:
the measuring circuit further includes a counter circuit that generates a count value from the periodic signal.

10. The system of claim 9, wherein:
the measuring circuit further includes a comparator that compares the count value to a predetermined count limit value.

11. The system of claim 5, wherein:
the switch controller sequentially enables different sets of M switch devices in a second mode, where M<N.

12. A capacitive sensing method, comprising:
in a scan operation coupling different sets of multiple capacitive sensor inputs to a common node; and
for each set of capacitive sensor inputs, determining whether the capacitance at the common node is within a given range, including charging and discharging the common node within a given time period to generate a count value corresponding to the capacitance; and
generating a sense indication if the capacitance is outside the given range.

13. The capacitive sensing method of claim 12, further including:
  after coupling a set of capacitive sensor inputs to the common node, but before determining whether the capacitance at the common node is within a given range, providing a charge current to the common node.

14. The capacitive sensing method of claim 12, further including:
  after determining whether the capacitance at the common node is within a given range, discharging the common node.

15. The capacitive sensing method of claim 12, wherein:
  determining whether the capacitance at the common node is within a given range further includes comparing the count value to a predetermined limit.

16. The capacitive sensing method of claim 12, further including:
  in an idle operation, isolating all sets of capacitive sensor inputs from the common node.

\* \* \* \* \*

UNITED STATES PATENT AND TRADEMARK OFFICE
CERTIFICATE OF CORRECTION

PATENT NO. : 7,375,535 B1  Page 1 of 1
APPLICATION NO. : 11/230719
DATED : May 20, 2008
INVENTOR(S) : Harold Kutz et al.

It is certified that error appears in the above-identified patent and that said Letters Patent is hereby corrected as shown below:

IN THE SPECIFICATION
At column 1, line 38, please replace "7041" with -- 704-1 -- so that the corresponding phrase reads -- a number of capacitive sensors 704-1 to 704-N --.

Signed and Sealed this

Eighteenth Day of November, 2008

JON W. DUDAS
*Director of the United States Patent and Trademark Office*